United States Patent [19]

Hiramatsu et al.

[11] Patent Number: 4,984,483
[45] Date of Patent: Jan. 15, 1991

[54] CONTROL SYSTEM FOR AN AUTOMATIC TRANSMISSION OF A MOTOR VEHICLE

[75] Inventors: Takeo Hiramatsu; Yuichi Tanaka, both of Kyoto, Japan

[73] Assignee: Mitsubishi Jidosha Kogyo Kabushiki Kaisha, Japan

[21] Appl. No.: 357,640

[22] Filed: May 19, 1989

Related U.S. Application Data

[63] Continuation of Ser. No. 38,340, Apr. 15, 1987, abandoned.

[51] Int. Cl.$^5$ .............................................. B60K 41/12
[52] U.S. Cl. .......................................... 74/866; 74/867
[58] Field of Search ........................... 74/866, 867, 869

[56] References Cited

U.S. PATENT DOCUMENTS

| | | | |
|---|---|---|---|
| 3,754,482 | 8/1973 | Sanders et al. | 74/752 D X |
| 3,956,947 | 5/1976 | Leising et al. | 74/866 |
| 4,314,340 | 2/1982 | Miki et al. | 74/866 X |
| 4,354,236 | 10/1982 | Miki et al. | 74/866 X |
| 4,393,467 | 7/1983 | Miki et al. | 74/866 X |
| 4,527,678 | 1/1985 | Pierce et al. | 74/866 X |
| 4,693,143 | 9/1987 | Harada et al. | 74/866 |
| 4,775,938 | 10/1988 | Hiramatsu | 79/866 X |
| 4,790,418 | 12/1988 | Brown et al. | 74/336 R X |

Primary Examiner—David A. Scherbel
Assistant Examiner—Creighton Smith
Attorney, Agent, or Firm—Abelman Frayne Rezac & Schwab

[57] ABSTRACT

A control system for an automatic transmission apparatus for vehicle in which, when an instruction signal to start a speed shift is generated, the engaging force of one engaging element to be released is controlled so that the rotation speed of the input shaft is regulated to be equal to a predetermined reference rotation speed higher that the rotation speed before the generation of the instruction signal and, after an effective shift is detected, the engaging force of the other engaging element to be engaged is controlled so that the changing rate of the rotation speed of the input shaft converges to a predetermined reference changing rate, thereby preventing simultaneous complete engagement of both engaging elements and accomplishing a smooth changeover of the torque transmission path.

6 Claims, 7 Drawing Sheets

CONTROL SYSTEM FOR AN AUTOMATIC TRANSMISSION OF A MOTOR VEHICLE

This application is a continuation of application Ser. No. 038,340, filed Apr. 15, 1987.

FIELD OF THE INVENTION

This invention relates to a control system for an automatic transmission of a motor vehicle.

DESCRIPTION OF THE PRIOR ART

In a prior art automatic transmission apparatus for a motor vehicle, such as disclosed in U.S. Pat. No. 2,995,957, during an upward speed shift from a lower speed ratio to a higher speed ratio, the change rate of an engaging-side engaging element is controlled by the rotational speed of the engine, thereby reducing shift shock during the speed shift.

However, with the above described arrangement, it has been difficult to accomplish a smooth change-over of the torque transmission path from the releasing-side engaging element to the engaging-side engaging element. If the releasing-side engaging element is released before the engaging-side engaging element is delayed relative to the engagement of the engaging-side engaging element, then, both engaging elements are engaged simultaneously, causing speed shift shock and discomfort to passengers of the vehicle.

SUMMARY OF THE INVENTION

It is a primary object of the present invention to provide a control system for an automatic transmission of a motor vehicle, which can accomplish a smooth change-over during a shift from one speed ratio to another.

In accordance with the present invention, there is provided a control system for an automatic transmission of a motor vehicle. The transmission is of the type having input shaft supplied with a drive force, engaging a first engaging element and releasing a second engaging element to accomplish a shift from a first speed ratio to a second speed ratio, control means for controlling the engaging forces of the engaging elements during the shift, and means for generating an instruction signal to start the shift.

The control has a detector for detecting a shift effected by the first engaging element, and a detector for detecting the rotational speed of the input shaft. A first engaging force control means controls the engaging force of the second engaging element in dependence on the instruction signal, and the rotational speed of the input shaft is regulated to be equal to a predetermined reference speed. The rotational speed is higher by a predetermined value than the rotational speed before generation of the instruction signal. A second engaging force control means is provided for starting engagement according to generation of the instruction signal and, after the detecting means detects start of an effective shift, for controlling the engaging force of the first engaging element.

With the above described arrangement, the engaging force of the second engaging element is controlled according to the generation of the instruction signal so that the rotational speed of the input shaft is equal to the reference rotational speed. The reference rotational speed is higher by a predetermined value than the rotational speed of the input shaft before the generation of the instruction signal. After an effective engagement is initiated by the start of engagement of the first engaging element, the engaging force of the first engaging element is controlled to a desired value. This prevents the first and second engaging elements from entering complete engagement simultaneously, thereby accomplishing a smooth change-over of the torque transmission path from the second engaging element to the first engaging element.

DESCRIPTION OF THE PREFERRED EMBODIMENT

A preferred embodiment of the present invention will be described with reference to the drawings.

Figure 1:
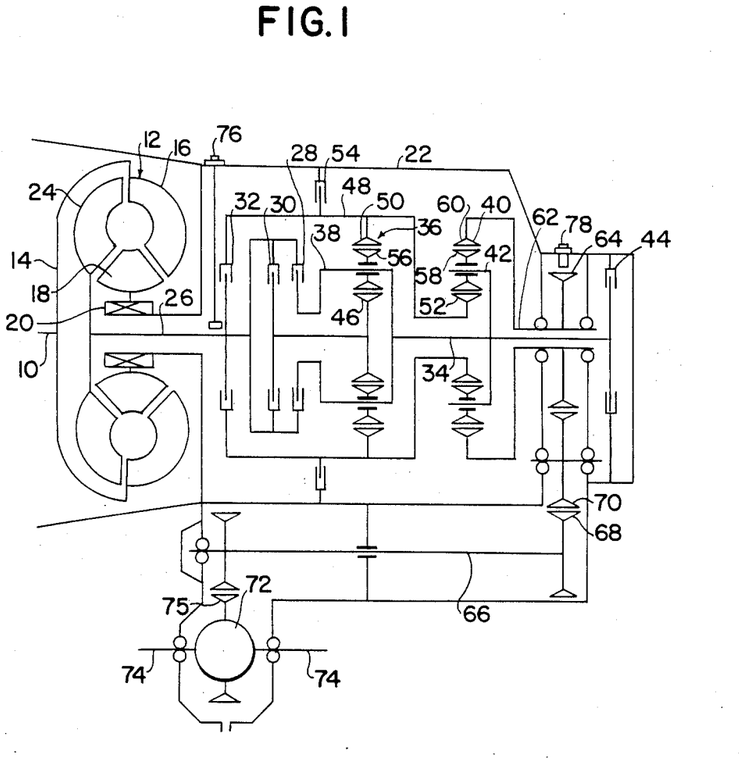
FIG. 1 is a schematic view showing diagrammatically a power train of an automatic transmission for a vehicle to which an embodiment of the present invention has been applied.

Referring to FIG. 1, a drive shaft 10 directly connected to a crank shaft of an engine, which is not shown, is connected to a pump 16 of a torque converter 12 through an input casing 14 of the torque converter 12 through an input casing 14 of the torque converter 12. A stator 18 of the torque converter 12 is connected to a transmission casing 22 through a one-way clutch 20. A turbine 24 of the torque converter 12 is connected to a clutch 28, a clutch 30, and a clutch 32 through an input shaft 26. The output side of the clutch 28 is connected to a first carrier 38 of a first simple planetary gear unit 36 (hereinafter simply referred to as a "first gear unit 36") through a first intermediate shaft 34, a second carrier 42 of a second simple planetary gear unit 40 (hereinafter simply referred to as a "second gear unit 40"), and a brake 44 to stop rotation of the first intermediate shaft 34. The output side of the clutch 30 is connected to a first sun gear 46 of the first gear unit 36. The output side of the clutch 32 is connected to a first ring gear 50 of the first gear unit 36 and a second sun gear 52 of the second gear unit 40 through a second intermediate shaft 48, and a brake 54 to stop rotation of the second intermediate shaft 48.

The first gear unit 36 consists of the first sun gear 46, a first pinion gear 56 engaging with the sun gear 46, the first carrier 38 which rotatably supports the pinion gear 56 and is rotatable around itself, and the first ring gear 50 engaging with the first pinion gear 56. The second gear unit 40 consists of the second sun gear 52, a second pinion gear 58 engaging with the sun gear 52, the second carrier 42 which rotatably supports the pinion gear 58 and is rotatable around itself, and a second ring gear 60 engaging with the second pinion gear 58. The second ring gear 60 engaging with the second pinion gear 58. The second ring gear 60 is connected to an output gear 64 through a hollow output shaft 62 into which the first intermediate shaft 34 is inserted.

The output gear 64 engages with a driven gear 68 provided at the right end of an intermediate transmission shaft 66 disposed almost parallel to the input shaft 26 through an idler 70, and the left end of the intermediate transmission shaft 66 is connected to a final reducing gear 75 which is connected to a driving shaft 74 through a differential gear unit 72.

As can be seen from FIG. 1, the transmission casing 22 is formed to contain the torque converter 12 to the output gear 64, the intermediate transmission shaft 66, and the differential gear unit 72.

Figure 2:
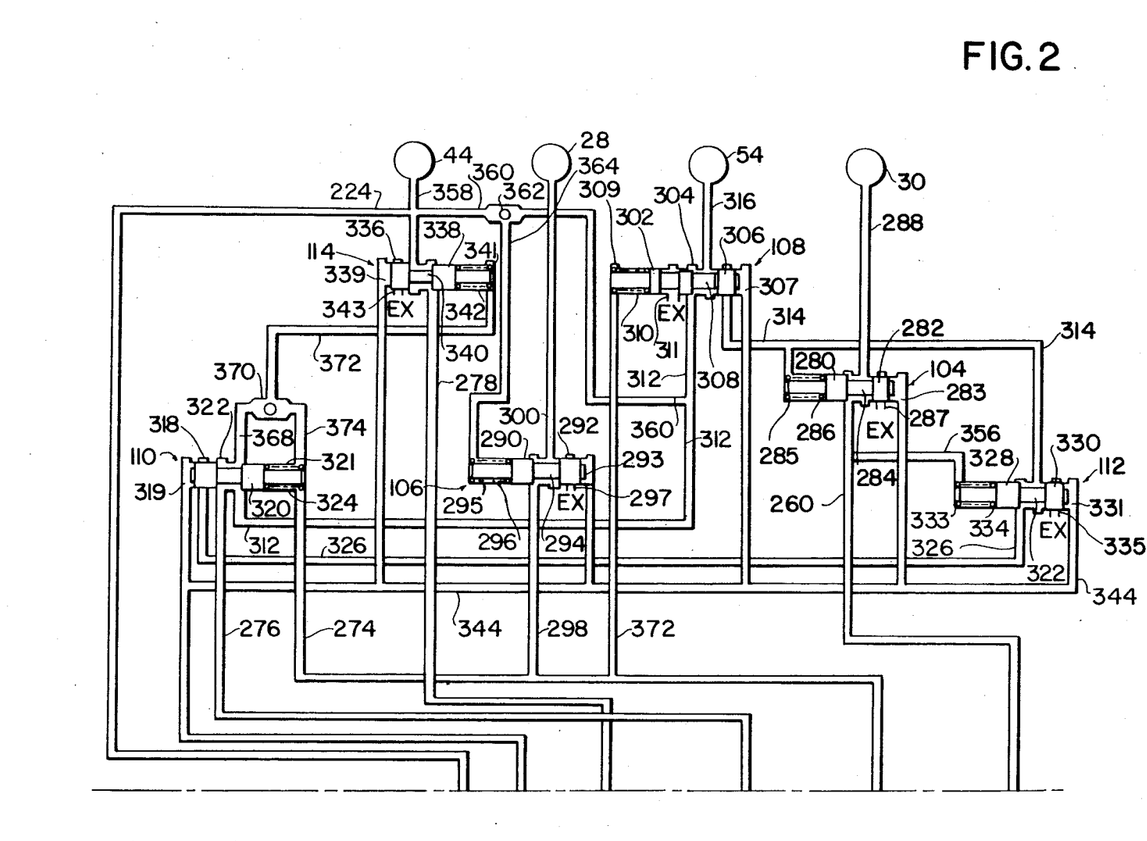
FIG. 2 is a circuit diagram of a hydraulic pressure control device of the automatic transmission.

The above clutches and brakes are provided with engaging piston units or servo units which will be described hereinlater, and which are actuated or released by supplying or removing hydraulic pressures. The hydraulic pressures are selectively supplied to or removed from individual clutches and brakes by the function of a hydraulic pressure control device which is shown in FIG. 2, and speed ratios of four forward stages and one back stage are accomplished by combinations of operation of the clutches and brakes.

Numeral 76 indicates an input shaft rotation speed sensor for detecting the rotation speed of the input shaft 26, and numeral 78 indicates a vehicle speed sensor for detecting the rotation speed of the output gear 64 (corresponding to the vehicle speed).

Table 1 shows the relationship between operation of the clutches and brakes and speed shift conditions, where a symbol "O" indicates engaging of the corresponding clutch or brake, and a symbol "—" indicates releasing of the same.

TABLE 1

|  | Clutch 32 | Clutch 30 | Clutch 28 | Brake 54 | Brake 44 |
|---|---|---|---|---|---|
| 1st speed | — | O | — | — | O |
| 2nd speed | — | O | — | O | — |
| 3rd speed | — | O | O | — | — |
| 4th speed | — | — | O | O | — |
| Reverse | O | — | — | — | O |

In the above described arrangement, when the brake 44 is engaged, the first carrier 38 and the second carrier 42 are locked to act as a reverse force element. When the clutch 30 is engaged, drive force from the driving shaft 10 is then transmitted through the torque converter 12, the input shaft 26, the engaged clutch 30, the first sun gear 46 and the first pinion gear 56, the first ring gear 50 to carrier 48. Carrier 48 in turn drives second sun gear 52, the second pinion gear 58, and the second ring gear 60 to drive the output shaft 62. Output shaft 62 in turn drives the output gear 64, the intermediate transmission shaft 66, and the final reduction gear 75, thus driving shaft 74, and thereby accomplishing the 1st speed ratio, as can be seen from Table 1.

When the brake 44 is released and the brake 54 is engaged, with the clutch 30 kept engaged, the first ring gear 50 and the second sun gear 52 are locked to act as a reverse force element, a drive force is then transmitted through the first sun gear 46, to the first carrier 38, and the second carrier 42, to drive the second ring gear 60, and the output shaft 62 and the output gear 64, thereby accomplishing the 2nd speed ratio.

When the brake 54 is released and the clutch 28 is engaged, with the clutch 30 kept engaged, then the first sun gear 46 and the first carrier 38 rotate in unison and the entire first gear unit 36 rotates in unison. Thus, the second sun gear 52 and the second carrier 42 rotate in unison, and the entire second gear unit 40 rotates in unison, thereby accomplishing the 3rd speed ratio. The input shaft 26 and the output gear 64 at this time have identical rotational speeds.

When the clutch 30 is released and the brake 54 is engaged with the clutch 28 kept engaged, the second sun gear 52 acts as a reverse force element. The drive force is then transmitted through the first intermediate shaft 34, to the second sun gear 52, and then to the second pinion gear 58. This drives the second carrier 42, and thus drives the output shaft 62 and the output gear 64 thereby accomplishing the 4th speed ratio. This is an over-drive speed ratio in which the rotational speed of the output gear 64 is greater than that of the input shaft 26.

When the clutch 28 and the brake 54 are released and the clutch 32 and the brake 44 are engaged, then, the second force is then transmitted through the second intermediate shaft 58, to the second sun gear 52, and to the second pinion gear 58. This drives the second ring gear 60, the output shaft 62, and the output gear 64, thereby accomplishing the reverse speed ratio.

A hydraulic pressure control device for the gear transmission shown in FIG. 1. and its operation to accomplish the speed ratios shown in Table 1 will now be described.

As shown in FIG. 2, oil from a reservoir 80 passes through a filter 82 to an oil passage 84 and is discharged by a variable discharge pump 86. The oil is supplied to the torque converter, and selectively to the clutches 28, 30, and 32 and to the brakes 44 and 54 to operate the respective clutches and brakes. The hydraulic pressure control device includes a pressure adjusting valve 88, a torque converter control valve 90, a pressure reducing valve 92, and a manually controlled valve 94.

Also included are a first hydraulic pressure control valve 96, a second hydraulic pressure control valve 98, a third hydraulic pressure control valve 100, and a fourth hydraulic pressure control valve 102.

Also included is a first change-over valve 104, a second change-over valve 106, a third change-over valve 108, a fourth change-over valve 110, a fifth change-over valve 112, and a sixth change-over valve 114.

A first solenoid valve 116, a second solenoid valve 118, a third solenoid valve 120, and a fourth solenoid valve 122 are provided, and these elements are interconnected with each other through oil passages.

The solenoid valves 116, 118, 120 and 122 are three-way valves and are each operated by electrical signals from an electronic control device 124. The respective values 116, 118, 120 and 122 include coils 126, 128, 130 and 132, valve bodies 134, 136, 138 and 140, and springs 142, 144, 146 and 148 each urging the valve bodies in the same direction. When the coils 126, 128, 130 and 132 are not energized, the valve bodies 134, 136, 138 and 140 close orifices close orifices 152, 154, 156 and 158 each disposed in an oil passage communicating with an exhaust port 150. This causes oil passages 162, 164, 166 and 168 to communicate with an oil passage 160, and to communicate with oil passages 178, 180, 182 and 184 having disposed therein orifices 170, 172, 174 and 176, respectively. When the coils are energized, the valve bodies close oil passages 162, 164, 166 and 168, and, cause the oil passages 178, 180, 182 and 184 to communicate with the exhaust port 150.

The electronic control device 124 outputs continuous currents to the solenoid valves 116, 118, 120 and 122 to duty-control hydraulic pressures in the oil passages 178, 180, 182 and 184 according to the operating condition of the vehicle. Main input factors to the electronic control device 124 include signals provided by the input shaft rotation speed sensor 76; by the vehicle speed sensor 78; by a valve opening sensor 194 for detecting the opening degree of a throttle valve of an engine which is not shown; by an oil temperature sensor 196 for detecting the lubricating oil temperature; by a select position sensor 198 for detecting the selected position of a shift lever disposed within the vehicle: and, by an auxiliary switch 200 for selecting three forward speed ratios or four forward speed ratios to be automatically shifted.

Hydraulic oil discharged from the oil pump 86 to an oil passage 202 is adjusted to a predetermined pressure by the pressure adjusting valve 88, and supplied to the torque converter control valve 90, to the pressure reducing valve 92 and to the manual valve 94.

The manual valve 94 has a spool 204 that can select six positions, L, 2, D, N, R, and P. When the L, 2, or D position is selected, the oil passage 202 communicates with an oil passage 206 to cause the gear transmission to accomplish one of the 1st through 4th speed ratios according to ON/OFF combination of the first solenoid valve 120, and the fourth solenoid valve 122.

When the N position is selected, communication of the oil passage 208 with the oil passage 206 and the oil passage 202 is blocked by land 210 of the spool 204, and the oil passages 206 and 208 are caused to communicate with oil discharge ports provided at both ends of the valve, thereby accomplishing the neutral condition.

When the R position is selected, the oil passage 202 communicates with the oil passage 208 to energize clutch 32 and accomplish the reverse speed ratio.

When the P position is selected as shown in FIG. 2, the land 210 of the spool 204 closes the oil passage 202 to set the gear transmission apparatus to a substantial neutral condition.

The pressure adjusting valve 88 has pressure receiving surfaces 214, 216 and 218. When the 2nd, 3rd or 4th speed ratio is accomplished, hydraulic pressure from the oil passage 202 is applied to the pressure receiving surface 214 through an oil passage 226 to adjust the hydraulic pressure from the oil passage at a predetermined value (hereinafter referred to as a "first line pressure"). When the 1st speed ratio is accomplished, hydraulic pressure from the oil passage 202 is applied to the pressure receiving surface 214 and that from an oil passage 224 is applied to the pressure receiving surface 216 to adjust the hydraulic pressure of the oil passage 202 at a predetermined value (hereinafter referred to as a "second line pressure") which is higher than the first line pressure. When the reverse speed ratio is accomplished, hydraulic pressure of the oil passage 226 communicating with the oil passages 202, 224, and 208 is applied to the pressure receiving surfaces 214, 216 and 218 respectively, to adjust the hydraulic pressure of the oil passage 202 at a predetermined value (hereinafter referred to as a "third line pressure") which is higher than the second line pressure.

The torque converter control valve 90 has a spool 228 and a spring 230. Hydraulic pressure in the oil passage 202 is applied to a rightmost pressure receiving surface of the spool 228 through oil passages 232, 234 and 236 and acts against the spring 230 to adjust the hydraulic pressure in the oil passage 234 to a predetermined value. Hydraulic oil discharged from the torque converter 12 is passed through an oil cooler 238 and supplied to various parts of the transmission apparatus as a lubricant.

The pressure reducing valve 92 has a spool 240 and a spring 242. Oil pressure exerted on opposed surface 244 and 247 on the spool 240 is balanced against the urging force of the spring 242, and reduces the hydraulic pressure from the oil passage 202 to a predetermined value which is lower than the first line pressure, and supplies the reduced hydraulic pressure through passage 160 to the left hand sides of hydraulic pressure control valves 96, 98, 100 and 102 as described later. The reduced hydraulic pressure is further adjusted by the solenoid valves 116, 118, 120 and 122, and is supplied to the right-hand sides of the hydraulic pressure control valves 96, 98, 100 and 102.

The first hydraulic pressure control valve 96 has a spool 248 and a spring 250, and can control the hydraulic pressure to be supplied form the oil passage 206 to an oil passage 260 according to the duty ratio of the first solenoid valve 116. The hydraulic pressure in oil passage 160 is varied according to an increase or decrease in duty ratio of the first solenoid valve 116 and is applied to pressure receiving surface 252 of the spool 248 and is additive to the urging force of the spring 250, and, to a resultant force due to a difference in area between a pressure receiving surface 253 and a land 254, and a difference in area between pressure receiving surfaces 256 and 257. When the first solenoid valve is continuously energized, that is, the duty ratio is 100%, the control hydraulic pressure applied to the pressure receiving surface 252 is zero, and the spool 248 is shifted to the right in the figure to cause the land 254 to close a port 258, and, the oil passage 260 to communicate with the oil discharge port, thereby interrupting hydraulic pressure to the oil passage 260. When the duty ratio is 0% (continuously non-energized), the adjusted hydraulic pressure is applied to the pressure receiving surface 252 and the spool 248 is shifted to the left in the figure to open the port 258, thereby conducting the hydraulic pressure of the oil passage 206 without reduction.

The second hydraulic pressure control valve 98, the third hydraulic pressure control valve 100, and the fourth hydraulic pressure control valve 102, each have the same configuration as the first hydraulic pressure control valve 96, and have spools 262, 264 and 266, and springs 268, 270 and 272, respectively, which connect or disconnect communication of the oil passage 206 with the oil passages 274, 276 and 278 according to the ON/OFF operations and duty ratios of the associated second solenoid valve 118, the third solenoid valve 120 and the fourth solenoid valve 122 thereby controlling the hydraulic pressures in the oil passages 274, 276 and 278.

The change-over valves 104 through 114 are to prevent misoperation of related clutches and brakes and lock-up of the gear transmission apparatus in the event of malfunction of the electronic control device 124, and to accomplish the reverse speed ratio, the neutral speed ratio, and the 3rd forward speed ratio by changing over the manual valve 94.

The first change-over valve 104 has a spool 284 provided with lands 280 and 282 having the same pressure receiving area, a spring 286 pressing the spool 284 to the right in the figure, and hydraulic pressure chambers 283 and 285 formed at opposite ends of the spool 284. The right-hand hydraulic pressure chamber 283 is supplied with the line pressure through an oil passage 344 while oil pump 86 is in operation.

The left-hand hydraulic pressure chamber 285 is supplied with a hydraulic pressure when the clutch 30 must be positively released. Hydraulic pressure applied to pressure chamber 285 and the urging force of the spring 286 will overcome the hydraulic force produced by the line pressure supplied to the pressure chamber 283 to move the spool 284 to the right in the figure. Communication between the oil passage 260 and the oil passage 288 is interrupted by the land 280, and the oil passage 288 communicates with the exhaust port (EX) to positively release the clutch 30. When the pressure chamber 285 is not supplied with the hydraulic pressure, the hydraulic force in the pressure chamber 283 overcomes the urging force of the spring 286 to move the spool 284 to the leftmost position and to establish communication between the oil passage 260 and the oil passage 288, thereby enabling engagement of the clutch 30.

The second, fifth and sixth change-over valves 106, 112, and 114, each have the same configuration as the first change-over valve, and have spools 294, 332 and 320, springs 296, 334, and 324, hydraulic pressure chambers 293, 331 and 319 which are always supplied with the line pressure, and hydraulic pressure chambers 295, 333 and 324 which are selectively supplied with or removed from hydraulic pressures.

When the hydraulic pressure chambers 295, 333, and 324 are not supplied with hydraulic pressures, lands 292, 330 and 318 close exhaust ports, and cause passages 298 and 300 to communicate with oil passages 278 and 358 respectively. When the hydraulic pressure chambers 295, 333 and 341 are supplied with hydraulic pressures, lands 290, 328 and 320 close oil passages 298, 326 and 312, and cause the oil passages 300, 314 and 368 to communicate with the exhaust ports.

The third change-over valve 108 has a spool 308 provided with lands 302, 304 and 306 having the same pressure receiving area, a spring 310 pressing the spool 308 to the right in the figure, a hydraulic pressure chamber 307 which is always supplied with the line pressure, and a hydraulic pressure chamber 309 which is selectively supplied with a hydraulic pressure. When the hydraulic pressure chamber 309 is not supplied with a hydraulic pressure, the exhaust port (EX) is closed between the lands 302 and 304, and an oil passage 316 connected to the brake 54 communicates with an oil passage 312 (which will be described later) connected to the fourth change-over valve 110. When the hydraulic pressure chamber 309 is supplied with a hydraulic pressure, the oil passage 312 is caused to communicate with the exhaust port (EX), and the oil passage 316 is connected to the hydraulic pressure chamber 295 of the second change-over valve 106 and caused to communicate with the oil passage 314 connected to the fifth change-over valve 112.

The fourth change-over valve 110 has a spool 322 provided with lands 318 and 320 having the same pressure receiving area, a spring 324, a hydraulic pressure chamber 319 which is supplied with the line pressure, and a hydraulic pressure chamber 321 which is selectively supplied with a hydraulic pressure, thus having almost the same configuration as the other change-over valves except the third change-over valve 108. When the hydraulic pressure chamber 321 is not supplied with a hydraulic pressure, an oil passage 276 which is supplied with the hydraulic pressure from the third hydraulic pressure control valve 100 is caused to communicate with an oil passage 372 connected to the hydraulic 341 of the sixth change-over valve 114. When the hydraulic pressure chamber 321 is supplied with a hydraulic pressure, the land 320 closes the oil passages 312 and 368 and the oil passage 276 is caused to communicate with the oil passage 326 connected to the fifth change-over valve 112.

Table 2 shows the relationship between combinations of ON (energized) and OFF (non-energized) operations of the first through fourth solenoid valves 116, 118, 120 and 122, and speed ratios.

TABLE 2

| Speed ratio | First solenoid valve 116 | Second solenoid valve 118 | Third solenoid valve 120 | Fourth solenoid valve 122 |
|---|---|---|---|---|
| 1st | OFF | ON | ON | OFF |
| 2nd | OFF | ON | OFF | ON |
| 4th | ON | OFF | OFF | ON |
| Reverse | OFF | OFF | OFF | OFF |

Operation of the hydraulic pressure control device will be described. When the driver of a vehicle sets a prior art selector lever disposed within the vehicle to the P or N position, the manual valve 904 is set to the P or N position. When the engine of the vehicle starts to operate, a hydraulic pressure is generated by the oil pump 86 and is controlled at a predetermined value by the function of the pressure adjusting valve 88. Hydraulic pressure is supplied to the torque converter 12, via the torque converter control valve 90. The hydraulic pressure is adjusted in the pressure reducing valve 92, and is supplied to the oil passage 160, and also through the oil passage 344 to the hydraulic pressure chamber 319 of the fourth change-over valve 110, to the hydraulic pressure chamber 339 of the sixth change-over valve 114, to the hydraulic 293 of the second change-over valve 106, to the hydraulic pressure chamber 307 of the third change-over valve 108, to the hydraulic pressure chamber 283 of the first change-over valve 104, and to the hydraulic pressure chamber 331 of the fifth change-over valve 112.

As a result, the spools 322 and 340 of the fourth and sixth change-over valves 110 and 114 are moved to the right in the figure, and spools of other change-over valves are moved to the left in the figure.

When the driver of the vehicle selects the D position by operating the selector lever, the manual valve 94 is set to the D position, and hydraulic pressure in the oil passage 202 is supplied to the oil passage 206 through the manual valve 94. Then the electronic control device 124 outputs signals to energize the second solenoid valve 118 and the third solenoid valve 120, to immediately demagnetize the fourth solenoid valve 122, and to operate the first solenoid valve 116 with a predetermined duty ratio and then gradually decrease the duty ratio, finally down to demagnetization.

The valve bodies 136 and 138 of the energized solenoid valves 118 and 120 are moved upwards in the figure to close the orifices 188 and 190, and hydraulic pressure in the oil passages 180 and 182 is discharged from the exhaust port 150 through the orifices 172, 174, 154 and 156. As a result, the adjusted hydraulic pressure applied to the left-hand pressure receiving surfaces of the lands 346 and 348 of the second and third hydraulic pressure control valves 98 and 100 overcomes the urging force of the springs 268 and 270 to move the spools 262 and 264 to the right in the figure, thereby interrupting communication of the oil passage 274 and 276 to communicate with the exhaust port 269 and 271. Since the valve body 140 of the demagnetized fourth solenoid valve 122 has closed the orifice 158, the adjusted hydraulic pressure from the oil passage 160 is applied without reduction to the right-hand pressure receiving surface of the spool 266, through the oil passage 184, to hold the spool 266 at the leftmost position in the figure.

Communication between the oil passage 206 and the oil passage 278 is maintained through an oil passage 350, a ball valve 352, and an oil passage 354. The hydraulic pressure in the oil passage 278 is supplied through the sixth change-over valve 114 and the oil passage 358 to operate the brake 44. The hydraulic pressure conducted to the oil passage 358 is also supplied to the hydraulic pressure chamber 295 of the second change-over valve 106 through an oil passage 350, a ball valve 362, and an oil passage 364, to move the spool 294 to the right. The oil passage 298 is closed by the land 290, and the oil passage 300 is caused to communicate with the exhaust port, thereby positively maintaining release of the clutch 28.

The hydraulic pressure in the oil passage 358 is also applied to the pressure receiving surface 216 of the pressure adjusting valve 88 through the oil passage 224 to adjust the hydraulic pressure in the oil passage 202 to the second line pressure.

Since the first solenoid valve 116 is operated with a predetermined duty ratio, a hydraulic pressure with a value corresponding to the position of the spool 248 is conducted to the oil passage 260, (i.e., the resultant of the hydraulic force determined by the duty ratio as applied to the right-hand pressure receiving surface of the spool 248, and, the urging force of the spring 250, and, the hydraulic force applied to each pressure receiving surface of the spool 248. Pressure in the passage 260 is conducted to the clutch 30 through the first change-over valve 104 and the oil passage 288. This engages the clutch 30 with an engaging face according to the value of the hydraulic pressure. The pressure in the oil passage 260 is also supplied to the hydraulic pressure chamber 333 of the fifth change-over valve 112 through the oil passage 356. When the hydraulic pressure in the oil passage 260 begins to increase, the engaging force of the clutch 30 increases, and the pressure in the hydraulic pressure chamber 333 of the fifth change-over valve 112 also increases. When the hydraulic force applied to the left-hand pressure receiving surface of the land 328 and the urging force of the spring 334 exceed the hydraulic force applied to the right-hand pressure receiving surface of the land 330, then, the spool 332 is moved to the rightmost position in the figure. Oil passage 314 then communicates with the exhaust port 335, and the spool 284 of the first change-over valve 104 is positively moved to the left to interrupt communication of the oil passage 288 with the exhaust port 287. When the duty ratio is zero, the hydraulic pressure in the oil passages 260 and 288 is equal to the second line pressure, and the clutch 30 engages with an engaging force corresponding to the second line pressure, thereby accomplishing the 1st speed ratio.

When a relatively large torque is to be transmitted in the 1st speed ratio, the second line pressure is supplied to operate the clutch 30 and the brake 44 with greater engaging forces, thereby enabling transmission of a relatively larger torque.

When the vehicle begins to run and the electronic control device 124 determines the need for a shift-up to the 2nd speed ratio as determined by the throttle opening signal and vehicle speed, then, the electronic control device 124 then outputs signals to maintain the first solenoid valve 118 in the demagnetized state and the fourth solenoid valve 122 in the energized state, and also, to gradually decrease the duty ratio of the third solenoid valve 120 from 100% to finally 0%, and additionally to gradually increase the duty ratio of the fourth solenoid valve 122 from 0% to finally 100%.

Since the first solenoid valve 116 is maintained in the non-energized state, the clutch 30 is maintained in the engaged state, and, since the second solenoid valve 118 is maintained in the energized state, communication of the oil passage 206 with the oil passage 274 is interrupted.

Since the fourth solenoid valve 122 is controlled so that the duty ratio increases from 0% to 100%, the oil passage 184 begins to communicate with the exhaust port 150 and to decrease the hydraulic pressure in the oil passage 184. The spool 266 is thus gradually moved to the right in the figure. Oil passage 278 then communicates with an exhaust port 273, and the hydraulic pressure in the oil passage 278 begins to gradually decrease, as does the hydraulic pressure in the oil passage 358, and, the engaging force of the brake 44 begins to decrease. The hydraulic pressure in the oil passages 224 and 358 also decreases, and the hydraulic force applied to the pressure receiving surface 216 of the pressure adjusting valve 88 also decreases. The spool 220 is then balanced at a position in which the hydraulic pressure in the oil passage 202 is decreased.

When the duty ratio is further increased, the hydraulic pressure in the oil passages 278 and 358 is further decreased, and, the engaging force of the brake 44 is further reduced for it to be finally released. The pressure in the oil passage 202 is also decreased to finally converge at the first line pressure (100% duty ratio).

Since the duty ratio of the third solenoid valve 120 gradually decreases from 100%, spool 264 is gradually shifted to communicate oil passage 276 with the oil passage 206, and close off exhaust port 271. Hydraulic pressure in the oil passage 276 thus is gradually increased and conducted to the fourth change-over valve 110. Part of the hydraulic fluid is conducted through the oil passage 312, to the third change-over valve 108, and to the oil passage 316 to the brake 54 to gradually operate the brake 54 in the engaging direction. Part of the hydraulic fluid is also conducted into the oil passage 312, and is conducted through the oil passage 360, the ball valve 362, and the oil passage 364 to the hydraulic pressure chamber 362 of the second change-over valve 106. Another part of the hydraulic fluid is conducted through the oil passage 368, a ball valve 370, and an oil passage 372 to a hydraulic pressure chamber 341 of the sixth change-over valve 114. When the duty ratio is further decreased and the hydraulic pressure in the oil passage 276 is further increased, the engaging force of the brake 54 further increases, and the hydraulic pressure in the hydraulic pressure chamber 293 of the third change-over valve 106 and also the hydraulic pressure chamber 341 of the sixth change-over valve 114 increases. When the resultant force of the hydraulic pressure and the urging force of the spring 296 or 342 exceeds the hydraulic force in the hydraulic pressure chamber 293 or 339, the spool 294 is moved to the right in FIG. 2 and the spool 340 to the left to cause the oil passage 300 to communicate with an exhaust port 343, thereby discharging residual pressure in the oil passages 300 and 358.

When the duty radio of the third solenoid valve is zero (demagnetized), the brake 54 is engaged with an engaging force corresponding to the first line pressure.

Next, when the vehicle speed further increases and the electronic control device determines the need for a shift from the 2nd speed ratio to the 3rd speed ratio, the electronic control device 124 outputs signals to maintain the first solenoid valve 117 in the demagnetized state and the fourth solenoid valve 122 in the energized state.

The duty ratio of the third solenoid is gradually increased from 0% to 100%, and, the duty ratio of the second solenoid valve 118 is gradually decreased 100% to finally 0%.

Since the first solenoid valve 116 is maintained in the demagnetized state, communication is established between the oil passage 206 and the oil passage 288 through the first hydraulic pressure control valve 96, the oil passage 260, and the first change-over valve 104. The clutch 30 is thus maintained in the engaged state. Since the fourth solenoid valve 122 is maintained in the energized state, communication of the oil passage 278 with the exhaust port 273 is maintained, and the brake 44 does not operate.

Since the third solenoid valve 120 is operated with the duty ratio gradually increasing from 0%, the spool 264 of the third hydraulic pressure control valve 100 is gradually shifted to the right, and the hydraulic pressure in the oil passage 276 begins to be discharged from the exhaust port 271. As a result, the hydraulic fluid is supplied to the oil passage 276 and then through the fourth change-over valve 110 to the oil passage 326, and then through the fifth change-over valve 112 to the oil passage 314, and then to the third change-over valve 108. Pressure in the oil passage 316 gradually decreases, and the hydraulic pressure in the hydraulic pressure chamber 295 of the second change-over valve 106 also decreases, and the spool 294 of the value 106 is moved to the left to cause the oil passage 298 to communicate with the oil passage 300. As the duty ratio approaches 100%, the hydraulic pressure in the oil passage 276 further decreases, and the engaging force of the brake 54 further decreases to be finally released. In this case, the brake 54 is caused to communicate with the exhaust port 335 of the fifth change-over valve 112 through the oil passage 316, the third change-over valve 108, the oil passage 314, and the fifth change-over valve 112, thereby preventing misoperation of the brake 54.

Since the signal to the second solenoid valve 118 begins to gradually decrease from 100% duty ratio, the balancing point of the spool 262 of valve 98 is gradually shifted to the left in the figure. Oil passage 274 then begins to communicate with the oil passage 206, and the hydraulic pressure in the oil passage 274 begins to gradually increase and is conducted to the hydraulic pressure chamber 321 of the fourth change-over valve 110, and then to the hydraulic pressure chamber 341 of the sixth change-over valve 114. The hydraulic pressure in oil passage 274 is also communicated to the hydraulic pressure chamber 309 of the third change-over valve 108, and also to the clutch 28 through the second change-over valve 106 to operate the clutch 28 in the engaging direction. When the duty ratio further decreases, the spool 322 of the fourth change-over valve 110 and the spool 340 of the sixth change-over valve 114 are moved to the left, and the spool 308 of the third change-over valve 108 is moved to the right to cause the oil passage 276 to communicate with the oil passage 326 (valve 110) and oil passage 358 to communicate with the exhaust port 343 of valve 114, (preventing misoperation of the brake 44). Oil passage 314 is caused to communicate with the oil passage 316, and the oil passage 312 to communicate with the exhaust port 311 (valve 108), respectively, and, the engaging force of the clutch 28 is increased. When the duty ratio os 0%, the clutch engages with an engaging force corresponding to the first line pressure, thereby accomplishing the 3rd speed ratio.

When the vehicle speed further increases and the electronic control device 124 determines the need for a shift from the 3rd speed ratio to the 4th speed ratio, the electronic control device 124 then outputs signals to maintain the second solenoid valve 118 in the demagnetized state and the fourth solenoid valve 122 in the energized state. It then gradually increases the duty ratio of the first solenoid valve 116 from 0% to finally 100%, and gradually decreases the duty ratio of the third solenoid valve 120 from 100% to finally 0%.

Since the second solenoid valve 118 is maintained in the demagnetized state, communication between the oil passage 206 and the oil passage 274 is maintained. The first line pressure in the oil passage 274 is conducted through the oil passage 372 to the hydraulic pressure chamber 309 of the third change-over valve 108, and through the hydraulic pressure chamber 321 of the fourth change-over valve 110 and the oil passages 374 and 372 to the hydraulic pressure chamber 341 of the sixth change-over valve 114. This holds the spool 308 of the third change-over valve 108 to the right in the figure, and holds the spool 322 of the fourth change-over valve 110 to the left in the figure, and also holds the spool 340 of the sixth change-over valve 114 to the left in the figure, respectively. Since the hydraulic pressure in the oil passage 274 is also conducted through the oil passage 298, the second change-over valve 106, and the oil passage 300 to the clutch 28, the clutch 28 is maintained in the engaged state.

Since the fourth solenoid valve 122 is in the demagnetized state and oil passage 278 remains communicating with the exhaust port 273 of valve 102 as in the case of accomplishing the 3rd speed ratio, no hydraulic pressure is generated in the oil passage 278, and, since the oil passage 358 communicating with the brake 44 communicates with the exhaust port 343 of the sixth change-over valve 114, the brake 44 is prevented from misoperation.

The signal operating the first solenoid valve 116 is controlled so that the duty ratio gradually increases from 0%, and the hydraulic pressure in the oil passage 178 gradually decreases. The balancing point of the spool 248 of the first hydraulic pressure control valve 96 is gradually shifted to the right in the figure, and the oil passage 260 begins to communicate with the exhaust port 251 of valve 96. As a result, the hydraulic pressure in the oil passage 260 gradually decreases, and the engaging force of the clutch 30, which communicates with the oil passage 260 through the first change-over valve 104 and the oil passage 288, also gradually decreases. Also the hydraulic pressure in the hydraulic pressure chamber 333 of the fifth change-over valve 112, which communicates with the oil passage 260 through the oil passage 356, gradually decreases. When the duty ratio further decreases and the hydraulic pressure in the oil passage 260 further decreases, then, the engaging force of the clutch 30 is further reduced, the hydraulic pressure in the hydraulic pressure chamber 333 of valve 112 decreases, and the spool 332 of valve 112 is moved to the left in the figure to cause the oil passage 326 to communicate with the oil passage 314. When the duty ratio is 100%, the hydraulic pressure in the oil passage 260 is 0 kg/cm$^2$, and the clutch 30 is disengaged.

Since the signal operating the third solenoid valve 120 is controlled so that the duty ratio gradually decreases from 100%, the hydraulic pressure in the oil passage 182 increases, and the balancing point of the spool 264 of value 100 is shifted to the left in the figure. Communication between the oil passage 276 and the exhaust port 271 of value 100 is thus interrupted, and the oil passage 276 begins to communicate with the oil passage 206. Hydraulic pressure in the oil passage 276 is then conducted through the fourth change-over valve 110, to the oil passage 326, and then to the fifth change-over valve 112. It then passes to the oil passage 314 to the third change-over valve 108, and to the oil passage 316 to the brake 54 to operate the brake 54 in the engaging direction. Hydraulic pressure is also conducted to the hydraulic pressure chamber 285 of the first change-over valve 104. When the duty ratio further decreases, the hydraulic pressure in the oil passage 276 increases, and the engaging force of the brake 54 increases. When the resultant force of the hydraulic force in the hydraulic pressure chamber 285 of value 104 and the urging force of the spring 286 exceeds the hydraulic force in the hydraulic pressure chamber 283, the spool 284 is moved to the right in the figure to cause the oil passage 288 of clutch 30 to communicate with the exhaust port 287, thereby preventing misoperation of the clutch 30. When the duty ratio is 0%, the hydraulic pressure in the oil passage 274 is equal to the first line pressure, and thus the brake 54 is engaged with the engaging force corresponding to the first line pressure, thus accomplishing the 4th speed ratio.

The up-shift operations from the 1st speed ratio to the 4th speed ratio have been described above. The procedure of the down-shift operations from the 4th speed ratio to the 1st speed ratio is the reverse of the up-shift operations and will not be described herein.

When the selector lever is set to the 2 or L position, the electronic control device 124 instructs so that the speed shift is performed between the 1st and 2nd speed ratios, or fixed at the first speed ratio. The hydraulic operation is the same as that for the case the selector lever is set to the D position, and will not be described herein.

When the driver of the vehicle selects the R position by operating the selector lever to set the manual valve 94 to the R position, the oil passage 202 communicates with the oil passage 208, and communication between the oil passage 202 and the oil passage 206 is interrupted. The electronic control device 124 outputs signals to demagnetize all the solenoid valves. The hydraulic pressure conducted to the oil passage 208 is supplied to engage the clutch 32, and is also supplied to the pressure adjusting valve 88 through the oil passage 226 to be applied to the pressure receiving surface 218. It is also supplied through the oil passage 376 to the ball valve 352 and the oil passage 354, to the fourth hydraulic pressure control valve 102, and then to the oil passage 278, and the sixth change-over valve 114 to the oil passage 358, then to the oil passage 360, and the oil passage 224 respectively.

The hydraulic pressure conducted to the oil passage 358 operates the brake 44, and the hydraulic pressure conducted to the oil passage 360 is conducted through the ball valve 362 and the oil passage 364 to the hydraulic pressure chamber 295 of the second change-over valve 106 to move the spool 294 to the right in the figure. This closes the oil passage 298, and causes the oil passage 300 to communicate with the exhaust port 297 to prevent misoperation of the clutch 28. The hydraulic pressure conducted to the oil passage 224 of brake 44 is supplied to the pressure adjusting valve 88 and is applied to the pressure receiving surface 216 of valve 88. The hydraulic pressure in the oil passage 202 is thus increased to the third line pressure by the hydraulic pressure applied to the pressure receiving surfaces 216 and 218, to engage the clutch 32 with a relatively stronger force, thereby ensuring a sufficient torque capacity of the brake 44 and of clutch 30 when the reverse speed ratio is accomplished and a relatively large torque is to be transmitted.

When a malfunction occurs in the electronic control device 124, the electronic control device 124 detects the malfunction and shuts off signals outputted to the solenoid valves to move all the spools of the hydraulic pressure control valves to the leftmost positions in the figure. Therefore, if the manual valve 94 is set to at least one of the positions to accomplish forward speed ratios (D, 2, L) and the oil passage 202 communicates with the oil passage 206, then; the line pressure is conducted through the oil passage 206 to the hydraulic pressure control valves.

The hydraulic pressure conducted from the first hydraulic pressure control valve 96 to the oil passage 260 is conducted to the left-hand hydraulic pressure chamber of the fifth change-over valve 112 to move the spool 332 to the right in the figure and to interrupt communication between the oil passage 326 and the oil passage 314. It is also conducted through the first change-over valve 104 and the oil passage 288 to the clutch 30 to engage the clutch 30.

The hydraulic pressure conducted to the second hydraulic pressure control valve 98 is conducted through the oil passage 274 to the oil passage 372 and the leftmost hydraulic pressure chamber of the third change-over valve 108 to move the spool 308 to the right in the figure. It is also conducted through the oil passage 298, the second change-over valve 106, and the oil passage 300 to the clutch 28 to engage the clutch 28. It is also conducted to the rightmost hydraulic pressure chamber of the fourth change-over valve 110 to move the spool 322 to the left in the figure and to cause the oil passage 276 to communicate with the oil passage 326. It is also conducted through the oil passage 374 of valve 110, the ball valve 370, and the oil passage 372 to the rightmost hydraulic pressure chamber of the sixth change-over valve 114 to move the spool 340 to the left in the figure and to interrupt communication between the oil passage 278 and the oil passage 358 of brake 44.

The hydraulic pressure conducted from the third hydraulic control valve 100 to the passage 276 is conducted through the fourth change-over valve 110 and the oil passage 326 to the fifth change-over valve 112.

However, since communication between the oil passage 326 and the oil passage 314 is interrupted by the land 328 of the fifth change-over valve 112, the hydraulic pressure in the oil passage 326 is not conducted to the oil passage 314.

The hydraulic pressure conducted from the fourth hydraulic pressure control valve 102 to the oil passage 278 is conducted to the sixth change-over valve 114. However, since communication between the oil passage 278 and the oil passage 358 is interrupted by the land 338, the brake 44 does not operate.

Therefore, when the electronic control device 124 is in disorder and the manual valve 94 is set to the D, 2, or L position, the clutch 28 and the clutch 30 are in the engaged state, and the 3rd speed ratio is accomplished, thereby enabling the vehicle to run.

On the other hand, when the electronic control device 124 is in disorder and the manual valve 94 is set to the R position, as can be seen from Table 2, the operation is the same as for accomplishing the reverse speed ratio, in which the clutch 32 and the brake 44 are operated, and the reverse speed ratio can also be accomplished even when a malfunction occurs in the electronic control device 124.

In the above description, it has been assumed for simplicity that the supply and removal of hydraulic pressures during the speed shift are simply performed by duty-controlling the first solenoid valve 116 through the fourth solenoid valve 122. A hydraulic pressure control method for reducing a shock associated with speed shift will now be described for an example of a shift from the 2nd speed ratio at power-on to the 3rd speed ratio with reference to FIG. 3 through FIG. 5.

Figure 3A:
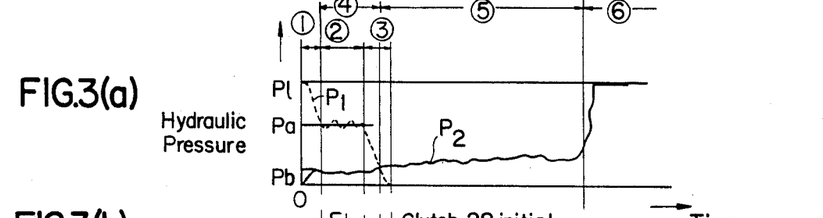
FIGS. 3(a)–3(c) are graphs of factors that change during a shift of the automatic transmission, FIG. 3(a) showing the hydraulic pressure, FIG. 3(b) showing the rotational speed of the input shaft, and FIG. 3(c) showing the output torque.
Figure 3B:
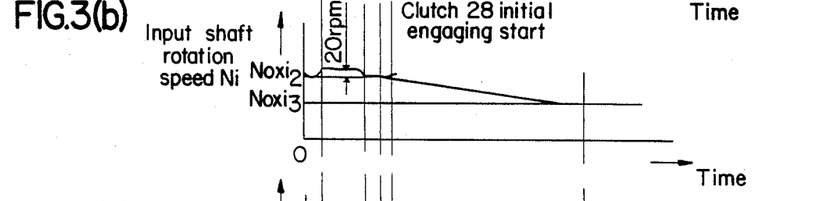
Figure 3C:
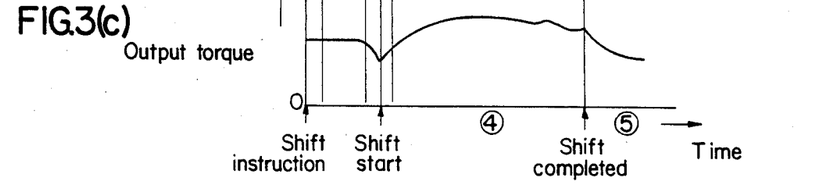
Figure 4A:
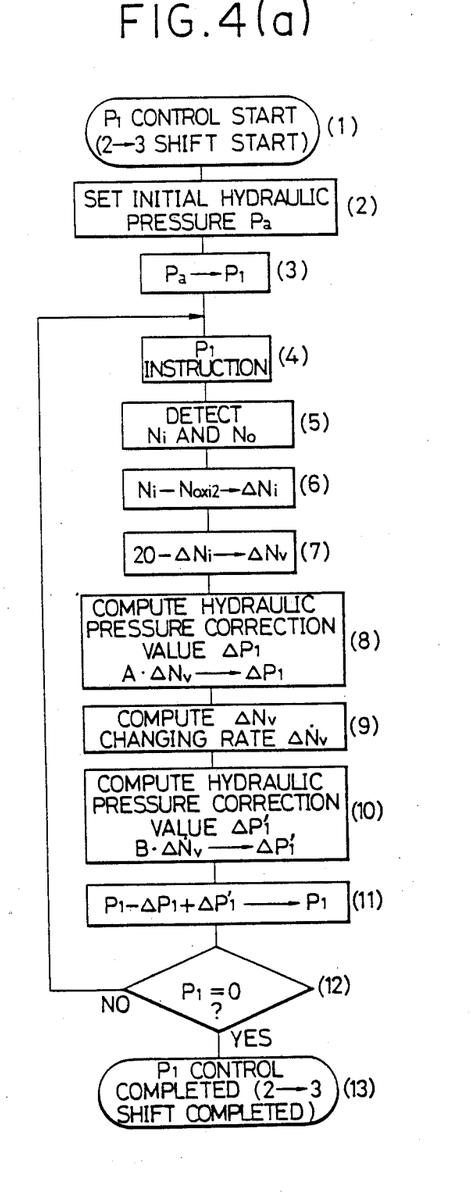
FIGS. 4(a) and 4(b) are control flow charts during a speed shift, FIG. 4(a) showing a control process of the releasing-side engaging element, and FIG. 4(b) showing a control process of the engaging-side engaging element.

FIGS. 3(a), (b), and (c) are graphs showing hydraulic pressures P1 and P2 supplied to engaging elements to be released and engaging elements to be engaged, an input shaft rotation speed Ni, and an output shaft torque vs. time. FIGS. 4(a) and (b) are flow charts for controlling the hydraulic pressures P1 and P2. FIGS. 5(a) and (b) are graphs showing the relation between the correction factors A and B in FIG. 4(a) and corrected hydraulic pressures.

When the 2nd speed ratio is accomplished, the second and fourth solenoid valves 118 and 122 are ON and the first and third solenoid valves are OFF, and the clutch 30 and the brake 50 are engaged with an engaging force corresponding to the first line pressure (hereinafter referred to as "P1"). When, based on the accelerator pedal position and the vehicle speed, the electronic control device 124 determines the need for an up-shift to the 3rd speed ratio, the electronic control device 124 outputs a shift-start instruction signal, and control signals for controlling the hydraulic pressures P1 and P2 to the clutch 28 to be engaged (the clutch 30 maintained in the engaged state) are outputted to the third solenoid valve 120 and the second solenoid valve 118 according to the flow charts in FIG. 4(a) and 4(b) described below.

The control procedure for the hydraulic pressure P1 supplied to the engaging element to be released will be described. When the shift-start instruction signal is outputted from the electronic control device 124, a program for controlling the hydraulic pressure P1 (step (1)) is started, and the second sun gear 52, which is fixed to the transmission casing 22 by the brake 54 through the second intermediate shaft 48, is allowed to rotate relative to the transmission casing 22.

A step (2) for setting an initial hydraulic pressure which is relatively lower than the first line pressure P1 is then executed.

A step (3) for setting the releasing-side hydraulic pressure P1 to a hydraulic pressure Pa then is executed.

A P1 instruction step (step 4) for energizing the third solenoid valve 120 with a duty ratio corresponding to the hydraulic pressure P1 is then executed. (Area (1) in FIG. 3).

Then, in a step (5), the rotation speed Ni of the input shaft 26 produced by the rotation of the second sun gear 52 relative to the transmission casing 22 and an output gear rotation speed No (corresponding to the vehicle speed) are detected.

In a step (6) a difference $\Delta Ni$ between the input shaft rotation speed Ni and a product $No \times i2$ (which is the product of the output gear rotation speed No and a 2nd speed gear ratio i2) is computed.

Then, a step (7) is executed which, in order to set the input shaft rotation speed Ni to a value higher by a predetermined rotation speed (20 rpm in this embodiment) then the product of the output gear rotation speed No. and the gear ratio i2, computes a difference $\Delta Nv$ between the rotation speed and the Ni.

A step (8) is then executed for computing a hydraulic pressure correction value $\Delta P1$ determined from the relation between $\Delta Nv$ and a gradient A shown in FIG. 5(a). This is for determining the value of $\Delta P1$ in proportion to the value of the difference $\Delta Nv$.

A step (9) is then executed for computing a changing rate $\Delta \dot{N}v$ of the $\Delta Nv$.

Figure 5A:
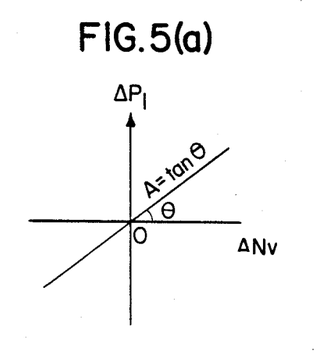
FIGS. 5(a) and 5(b) are graphs for determining correction hydraulic pressures, FIG. 5(a) showing a deviation $\Delta Ni$ between a reference rotation speed and an actual rotation speed of the input shaft relative to a correction factor A and a correction hydraulic pressure $\Delta P_1$, and FIG. 5(b) showing the deviation $\Delta Ni$ and the correction factor A relative to a correction hydraulic pressure $\Delta P1'$.
Figure 5B:
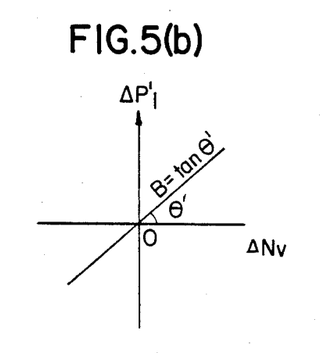

A step (10) is then executed for computing a hydraulic pressure correction value $\Delta P1'$ determined from the relation between the $\Delta Nv$ and a gradient B shown in FIG. 5(b).

Next, in step (11), $P1 - \Delta P1 + \Delta P1'$ is computed.

When $\Delta Nv$ is positive, the measured value is determined as to be smaller than the reference value, and the hydraulic pressure is corrected to decrease the engaging force of the brake 54.

When $\Delta Nv$ is negative, the hydraulic pressure is controlled to decrease the engaging force of the brake 54, and the correction value $\Delta P1$ is controlled in proportion to the value of the Nv.

When $\Delta \dot{N}v$ is positive and $\Delta$ is positive (measure value gradually decreasing from the reference value), $\Delta P1'$ is controlled to decrease the engaging force.

When $\Delta \dot{N}v$ is positive and $\Delta P1$ is negative (measured value gradually approaching the reference value) $\Delta P1'$ is controlled so that the engaging force is increased to prevent overshooting.

When $\Delta \dot{N}v$ is negative and $\Delta P1$ is positive (measured value gradually getting greater than the reference value), a new P1 is determined and the Pa is replaced with the new P1 to increase the engaging force.

When $\Delta \dot{N}v$ is negative and $\Delta P1$ is negative (measured value getting closer to the reference value), a new P1 is determined so that the Pa is replaced with the new P1 to prevent overshooting.

As far as the P1 is not determined to be zero in a determination step (12), the steps (4)–(12) are repeatedly executed, and the third solenoid valve 120 is operated with a duty ratio corresponding to the P1. (Area (2) in FIG. 3).

When the engaging-side engaging element (clutch 28), which will be described later, begins an initial engagement and, as a result, the input shaft rotation speed Ni begins to decrease, the hydraulic pressure to the brake 54 rapidly decreases to maintain the input shaft rotation speed Ni at No×i2+20(rpm), down to finally 0 (Area (3) in FIG. 3). When the determination step (12) determines P1 =0, the control for the hydraulic pressure P1 completes step (13).

In the above described flow chart, a changing rate ΔN of ΔNi is computed, and ΔP1' is determined from the ΔN and the coefficient B to correct the hydraulic pressure supplied to the brake 54 in the steps (9) and (10), however, the steps (9) and (10) can be omitted.

In the step (12), P1 is feedback-controlled until it is zero. Alternatively, however, a hydraulic pressure at the time the brake 54 is sufficiently released can be previously determined and, when the P1 is smaller than the predetermined hydraulic pressure, the feedback control can be stopped and then an instruction to set P1 to zero can be outputted.

Further, the control procedure for the hydraulic pressure supplied to the engaging-side engaging element will be described with reference to FIG. 4(b).

When the shift-start instruction signal is outputted from the electronic control device 124, a program to control the hydraulic pressure P2 is started (step (14)).

Figure 4B:
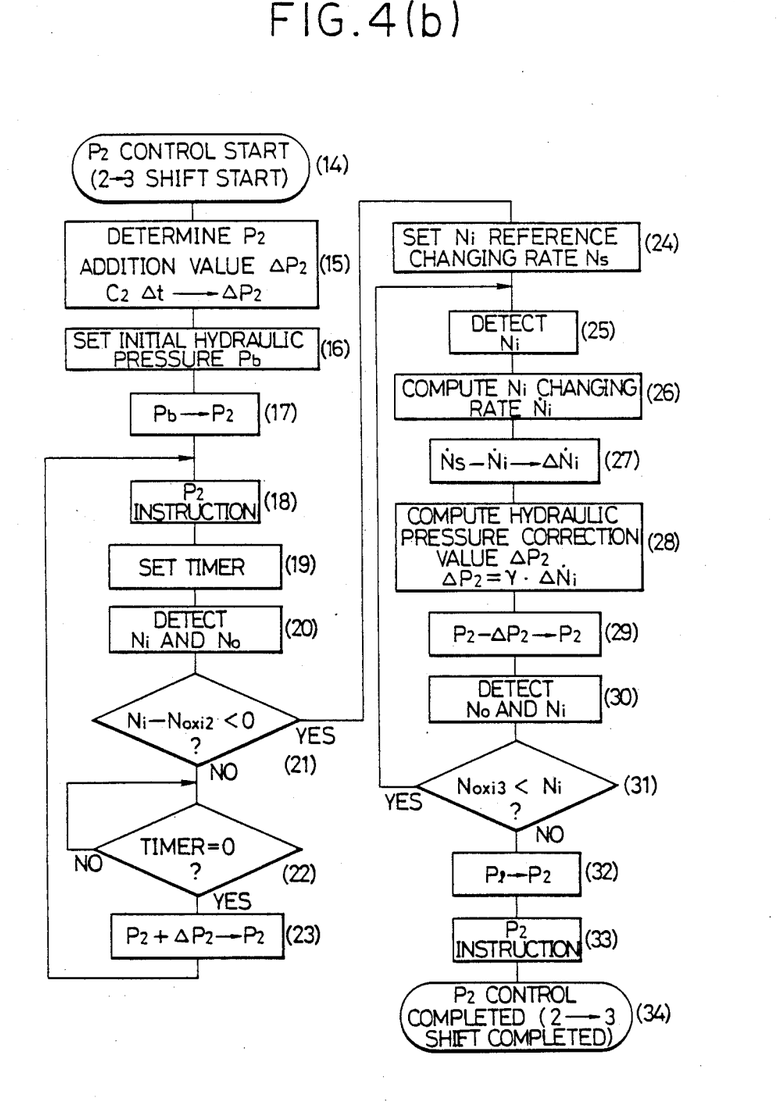

A signal to operate the second solenoid valve 118 so that the line pressure or a pressure close thereto is outputted in order to move the clutch 28 by the ineffective stroke (play) of the clutch to the initial engaging position within a short time as possible, for a predetermined period of time, or, until the clutch 28 makes a stroke to a predetermined position immediately before the initial engaging state (area (1) in FIG. 3, not shown in FIG. 4).

An addition value ΔP2 for P2 is determined from the product of a constant C2 and a timer setting time Δt (50 (msec), for example) in a step (15).

In a step (16), an initial hydraulic pressure Pb to maintain the clutch 28 in the initial engaging state is set.

Step (17) is for setting the engaging-side hydraulic pressure P2 to Pb.

A P2 instruction step (18) to operate the second solenoid valve 118 with a duty ratio corresponding to the hydraulic pressure P2 is then executed.

In a step (19), the timer is set to begin a reverse operation.

In a step (20) the input shaft rotation speed Ni and the output gear rotation speed No are detected.

A determination step (21) then determines whether or not the difference between the Ni and the product of the No and the 2nd speed gear ratio i2 is negative, that is, whether or not the initial engaging of the clutch 28 is started. The input shaft rotation speed Ni gradually decreases from a state in which Ni is controlled at a value higher by 20 rpm than that when the 2nd speed ratio is accomplished by the releasing-side engaging element (brake 54 in this case) for it to be lower than the Ni corresponding to the 2nd speed ratio to begin A speed shift.

If not, a determination step (22) is executed to determine whether or not the residual time of the timer set in the step (19) is zero. If the result is NO, the step is repeated until the residual time is zero. When the residual time is zero, the sum of the P2 determined in the step (17) and ΔP2 determined in the step (15) is used as a new P2.

Thus, a step (23) to increase the hydraulic pressure supplied to the clutch 28 by ΔP is executed to accomplish the initial engaging state of the clutch 28, and then the program returns to the step (18).

Steps (18) through (23) are repeatedly executed until start of the shift is detected in the step (21). (Area (4) in FIG. 3).

When start of the shift is determined in the step (21), a reference changing rate Ns of the input shaft rotation speed Ni during the shift is set based on various parameters indicative of the operating conditions of the vehicle including the accelerator pedal position, speed ratio, vehicle speed, and input shaft rotation speed in a step (24).

A current input shaft rotation speed Ni is detected in a step (25), and then an actual changing rate Ni of the Ni is computed in a step (26).

A difference ΔNi between the reference changing rate Ns set in the step (24) and the actual changing rate Ni computed in the step (26) is then computed in a step (27).

A hydraulic pressure correction value ΔP2 is computed from the product of the ΔNi and a gain y in step (28).

Then, in step (29) in which the difference between the hydraulic pressure P2 finally instructed in the step (18) and the ΔP2 is used as a new P2 is executed.

The input shaft rotation speed Ni and the output gear rotation speed No. are detected in a step (30).

A determination step (31) determines whether or not the product of the No. and the 3rd speed gear ratio is smaller than the Ni, that is, the 3rd speed ratio is not accomplished but is still in a shift operation.

If the result is YES, the steps (25) through (31) are repeatedly executed until the 3rd speed ratio is accomplished (area (5) in FIG. 3). When the 3rd speed ratio is accomplished, a step (32) is executed to set the hydraulic pressure P2 to the first line pressure P1.

In step (33), a signal (non-energizing signal) corresponding to the hydraulic pressure P2 set in the step (32) is outputted to the second solenoid valve 118 (area (6) in FIG. 3). Thus the control of the hydraulic pressure P2 is completed (step (34)).

Although, in the above described embodiment, the rotation speed of the input shaft 26 is detected to obtain Ni, and the rotation speed of the output gear 64 is detected to obtain No, the output shaft rotation speed of the engine can be detected instead of the rotation speed of the input shaft 26, and the rotation speed of the idler 70 instead of the output gear 64, to obtain almost the same effect as that of the embodiment.

While the shift operation from the 2nd speed ratio to the 3rd speed ratio has been described in the above embodiment, it is apparent that the same control can be applied to other up-shift operations.

By virtue of the arrangement of this embodiment, when the shift instruction signal is outputted from the electronic control device 124, the hydraulic pressure P1 to the brake 54 as the releasing-side engaging element is reduced from the first line pressure to the initial hydraulic pressure Pa. This causes a slip in the brake 54 so that the input shaft rotation speed Ni is 20 rpm higher than the value at the time the 2nd speed ratio is accomplished. A reduction in the output shaft rotation speed Ni due to the start of engagement of the clutch 28 as the engaging-side engaging element (start of shift) can thus be smoothly accomplished without a one-way clutch as used in a conventional transmission apparatus.

Moreover, no hunting nor divergence occurs in the hydraulic pressure, since, in order to make the measured value ΔNv equal to the reference value (20 rpm), the hydraulic pressure supplied to the engaging element is corrected not only according to the deviation of the measured value ΔNv relative to the reference value, but also in proportion to the changing rate of the deviation ΔNv.

When a malfunction occurs in the electronic control device 124, all the solenoid valves are set OFF, and the 3rd, neutral, and reverse speed ratios can still be accomplished, thereby making operation of the vehicle possible. Oil passages to engaging elements which are not related to a speed ratio to be accomplished, are changed over to communicate with exhaust ports by the function of the change-over valves, thereby preventing the gear transmission apparatus from locking.

The hydraulic pressure control valves 96 through 102, the solenoid valves 116 through 122, and the change-over valves 104 through 114 (except the third change-over valve 108) use common parts, thereby reducing the production cost and reducing the possibility of mis-assembly.

Further, the oil pump 86 is of a variable discharge type which can discharge only the required minimum amount of hydraulic oil, thus reducing the load on the engine.

According to the present invention, when an instruction signal is outputted, the engaging force of the second engaging element to be released is controlled so that the rotation speed of the input shaft is equal to the reference rotation speed which is higher by a predetermined value and, when start of an effective speed shift is detected, the engaging force of the first engaging element is controlled at a desired value, thereby preventing simultaneous engagement of the first and second engaging elements, accomplishing a smooth change-over of the torque transmission path from the second engaging element to the first engaging element without using a one-way clutch, and reducing a shift shock.

We claim:

1. A control system for an automatic transmission of a motor vehicle of the type having, an input shaft supplied with a drive force, first and second engaging elements capable of selecting gear ratios between said input shaft and an output shaft, a control device comprising engaging element change-over means for engaging said first engaging element and releasing said second engaging element to accomplish a shift from a first speed ratio to a second speed ratio, a control means for controlling engaging forces of said engaging elements during the shift, and an instruction means for generating an instruction signal to start the shift, further including:
   said control means having a detecting means for detecting an effective shift started by engaging said first engaging element;
   a rotation speed detecting means for detecting rotational speed of said input shaft;
   a first engaging force control means for controlling engaging force of said second engaging element according to generation of said instruction signal so as to regulate rotation speed of said input shaft to be equal to a predetermined reference rotational speed higher by a predetermined value than rotation speed before generation of said instruction signal; and,
   a second engaging force control means for starting engagement of said first engaging element according to generation of said instruction signal and, after said detecting means detects start of an effective shift, controlling engaging force of said first engaging element at a desired value.

2. A control system for an automatic transmission apparatus for vehicle as claimed in claim 1, wherein said control means has a changing rate detecting means for detecting changing rate of rotational speed of said input shaft, and engaging force of said first engaging element is controlled so as changing rate of rotational speed of said input shaft to converge to a predetermined reference changing rate.

3. A control system for an automatic transmission apparatus for vehicle as claimed in claim 1, wherein engaging force of said second engaging element is controlled by said first engaging force control means in proportion to a first value which is a difference between an actual rotational speed of said input shaft and said reference rotational speed, in a direction to increase engaging force when said first value is positive, or in a direction to decrease engaging force when said first value is negative.

4. A control system for an automatic transmission apparatus for vehicle as claimed in claim 1, wherein engaging force of said second engaging element is controlled by said first engaging force control means in proportion to a first value which is a difference between an actual rotational speed of said input shaft and said reference rotational speed and to a second value indicative of an actual changing rate of rotational speed of said input shaft, in a direction to increase engaging force when rotation speed of said input shaft is changing toward an increasing direction, or in a direction to decrease engaging force when rotational speed of said input shaft is changing toward a decreasing direction.

5. A control system for an automatic transmission apparatus for vehicle as claimed in claim 1, wherein the shift from said first speed ratio to said second speed ratio is a shift from a relatively lower speed ratio to a relatively higher speed ratio.

6. A control system for an automatic transmission apparatus for vehicle as claimed in claim 1, wherein the shift from said first speed ratio to said second speed ratio is carried out at the time a drive force is transmitted to said input shaft.

* * * * *